United States Patent
Deboeuf et al.

(10) Patent No.: US 10,081,147 B2
(45) Date of Patent: Sep. 25, 2018

(54) METHOD FOR CUTTING A STRIP OF TIRE REINFORCING PRODUCT COMPRISING WIRES AT AN ANGLE TO THE LONGITUDINAL DIRECTION OF THE PRODUCT

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Michel Deboeuf, Clermont-Ferrand (FR); Clement Dubois, Clermont-Ferrand (FR); Thierry Ducros, Clermont-Ferrand (FR); Stephane Ravat, Clermont-Ferrand (FR)

(73) Assignees: Compagnie Generale Des Etablissements Michelin, Clermont-Ferrand (FR); Michelin Recherche Et Technique, S.A., Granges-Paccot (CH)

(*) Notice: Subject to any disclaimer, the term of this patent is extended or adjusted under 35 U.S.C. 154(b) by 612 days.

(21) Appl. No.: 14/431,420

(22) PCT Filed: Sep. 19, 2013

(86) PCT No.: PCT/EP2013/069427
§ 371 (c)(1),
(2) Date: Mar. 26, 2015

(87) PCT Pub. No.: WO2014/048822
PCT Pub. Date: Apr. 3, 2014

(65) Prior Publication Data
US 2015/0239192 A1     Aug. 27, 2015

(30) Foreign Application Priority Data

Sep. 27, 2012   (FR) .................................... 12 59140

(51) Int. Cl.
*B29D 30/46*     (2006.01)

(52) U.S. Cl.
CPC ........ *B29D 30/46* (2013.01); *B29D 2030/466* (2013.01); *Y10T 29/49538* (2015.01); *Y10T 83/04* (2015.04)

(58) Field of Classification Search
CPC ... B29D 30/46; B29D 2030/466; Y10T 83/04; Y10T 29/49538
See application file for complete search history.

(56) References Cited

U.S. PATENT DOCUMENTS

| 4,857,123 A | 8/1989 | Still |
| 5,029,502 A | 7/1991 | Irie |

(Continued)

FOREIGN PATENT DOCUMENTS

EP     0447273 A2     9/1991

OTHER PUBLICATIONS

International Search Report for PCT/EP2013/069427 dated Nov. 20, 2013.

*Primary Examiner* — John C Hong
(74) *Attorney, Agent, or Firm* — Dickinson Wright PLLC

(57) ABSTRACT

The method includes the step of running a cutting means between two threads of the reinforcing ply. The method proceeds with the steps of measuring; a discrepancy between an actual cutting line (A'B'C') and a theoretical cutting line (ABC) is measured and determining a point of intersection of the actual cutting line (B') with a reference longitudinal line (XX') placed on the strip. The actual cutting line (B'C') of that part of the rubber profiled elements that are not superposed with the reinforcing ply is longitudinally offset (Continued)

(Z) with respect to the theoretical cutting line (BC) so that the actual cutting line (B'C') meets the reference longitudinal line (XX') at the point of intersection (B') of the reinforcing ply (A'B') with the reference longitudinal line (XX'). The rubber profiled elements that are not superposed with the reinforcing ply are cut along the said actual cutting line.

12 Claims, 4 Drawing Sheets

(56) References Cited

U.S. PATENT DOCUMENTS

| | | |
|---|---|---|
| 6,592,704 B1 | 7/2003 | Benzing, II |
| 8,424,673 B2 * | 4/2013 | Ravat ................. B29D 30/0016 198/606 |
| 9,539,737 B2 * | 1/2017 | Ravat ..................... B29D 30/46 |
| 9,701,079 B2 * | 7/2017 | Ducros .............. B29D 30/0061 |

* cited by examiner

METHOD FOR CUTTING A STRIP OF TIRE REINFORCING PRODUCT COMPRISING WIRES AT AN ANGLE TO THE LONGITUDINAL DIRECTION OF THE PRODUCT

This application is a 371 national phase entry of PCT/EP2013/069427, filed 19 Sep. 2013, which claims benefit of French Patent Application No. 1259140, filed 27 Sep. 2012, which is incorporated herein by reference for all purposes.

BACKGROUND

1. Field

The disclosure relates to the field of tire manufacture and more particularly to the tire building operations during which rubber products comprising reinforcing threads are joined or butted together.

2. Description of Related Art

These products are formed of a complex preassembly of continuous strips of rubber superposed on one another with determined overlap geometries. These preassemblies are performed with a view to reducing the final time taken to build the green tire by reducing the number of elementary products that have to be applied by winding to the tire-building drum.

In a known way, continuous strips of profiled elements intended to form the side wall and the bead region of a tire, for example, are preassembled.

Other preassemblies may comprise a greater number of elementary profiled elements such as, for example, an edging rubber reinforcing rubber and, in the specific case of the invention, a reinforcing ply comprising textile or metal reinforcing threads coated in rubber and making a given angle with the longitudinal direction of the ply. As a general rule, the reinforcing ply is only partially superposed on the rubber profiled elements.

These preassembled products are intended, for example, to form the bottom zone of a heavy vehicle tire, for which particular precautions are taken in order to protect this zone from mechanical and thermal attack.

During final build, a portion of given length is taken from the preassembled continuous strip formed of several elementary profiled elements or reinforcers and this portion is applied by winding around the tire-building drum of generally cylindrical shape.

It is therefore appropriate for the length of the portion of preassembled products to correspond very precisely to the circumference of the tire-building drum at the axial position assigned to it.

However, the cutting of these complex assemblies requires special attention.

Firstly, it is actually found that when the reinforcing ply is being cut, something which has to be done by running a cutting means between two threads, at the angle formed by these threads with the longitudinal direction of the strip, that the line along which the cutting means passing between two threads runs does not correspond to the theoretical cutting line determined after measuring the desired theoretical length of the portion of preassembled products that is to be applied to the tire-building means.

Secondly, it is often desirable to cut, using a separate cutting means, and at a different angle, the part of the rubber profiled elements that is not superposed on the reinforcing ply, in order for example to avoid laying and connecting front and rear edges that make a small angle with respect to the longitudinal direction.

There is therefore the issue of precisely determining the point at which two cutting lines meet so as to obtain a controlled geometry of the front and rear edges of the portion of preassembled complex products with a view to carrying out the operation of butting together these two edges which has to be performed on the tire-building drum.

This difficulty is amplified by the geometric variations in the products preassembled within the permitted manufacturing tolerances, it being possible for the said variations to affect both the angles of the threads and the widths of the reinforcing plies or of the rubber profiled elements.

SUMMARY

It is an object of an embodiment of the invention to provide an original solution to all of these problems.

More specifically, the method according to an embodiment of the invention provides steps during which
- a cutting means is run between two threads of the reinforcing ply,
- the discrepancy between the actual cutting line and a theoretical cutting line is measured, and the point of intersection of the actual cutting line with a reference longitudinal line placed on the strip is determined,
- the actual cutting line of that part of the rubber profiled elements that are not superposed with the reinforcing ply is longitudinally offset with respect to the theoretical cutting line so that the said actual cutting line meets the reference longitudinal line at the point of intersection of the actual cutting line of the reinforcing ply with the said reference longitudinal line, and the rubber profiled elements that are not superposed with the reinforcing ply are cut along the said actual cutting line.

That ensures that the point at which the cutting lines for the reinforcing ply and that of the rubber profiled elements which are not superposed with the reinforcing ply and which may be distinct from the theoretical meeting point meet is arranged at a known location. Knowing the correction value, it is thus possible to cut the profiled elements in such a way that the cutting edge is as clean as possible, and also to take account of this correction in order to adapt accordingly the device for laying the correct length of portion of strip on the tire-building drum.

In order to determine precisely the location of the reference line, prior to cutting, the strip is positioned in the frame of reference of the cutting device.

For preference, in order to cut the reinforcing ply, use is made of a cutting means able to assess the position of the actual cutting line.

For preference, the means of cutting the reinforcing ply may comprise a cutting wheel of circular shape that can be oriented according to the angle formed by the threads with the longitudinal direction of the strip and which is free to move in the direction of its axis of rotation.

For preference, the discrepancy between the actual cutting line and the theoretical cutting line is determined by measuring the distance between these two lines at at least two distinct points. For that all that is required is to measure the position of the cutting blade in the frame of reference of the cutting device in order to obtain the relevant data that will make it possible to determine the path of the cutting blade with respect to the reference line.

For preference, the cutting means continues to be run between the threads beyond the point of intersection of the actual cutting line and of the reference longitudinal line by a short distance of given value, so as to make it easier to detach the portion of strip after the part of the rubber profiled elements that is not superposed with the reinforcing ply has been cut.

The cutting line of that part of the rubber profiled elements that is not superposed with the reinforcing ply may make an angle with the longitudinal direction equal to or different from the angle of the threads of the reinforcing ply.

In this second case, the cutting line of the part of the rubber profiled elements that is not superposed with the reinforcing ply may preferably make a right angle with the longitudinal direction.

For preference, prior to cutting, the strip is moved under the cutting means by a given set length so as to form, after cutting, a portion of strip which is intended to be applied by winding to a tire-building drum of given circumference.

For preference, the set length of the portion of strip is adjusted so that it is equal to the circumference of the tire-building drum less a maximum given longitudinal offset.

That makes it possible, irrespective of the value of the longitudinal adjustment of the cut, to apply the portion of strip to the tire-building drum under tension and adjust the said laying tension in the known way to suit the set length increased by the value of the longitudinal offset of the actual cutting line.

BRIEF DESCRIPTION OF DRAWINGS

The following description is supported by FIGS. 1 to 4 in which.

DETAILED DESCRIPTION OF SPECIFIC EMBODIMENTS

Figure 1:
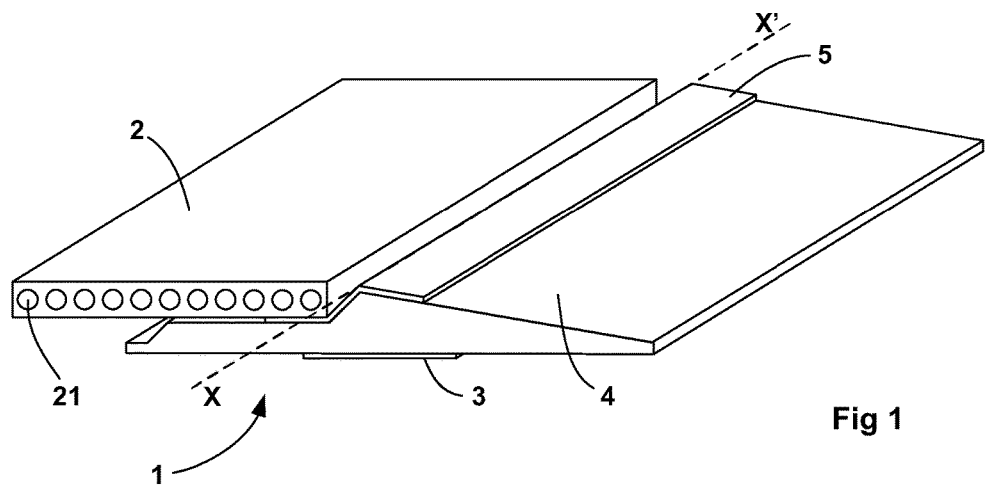
FIG. 1 depicts a schematic perspective view of a first type of strip formed of preassembled products

The strip of product 1 depicted in FIG. 1 comprises a reinforcing ply 2 formed of threads 21 coated in rubber and making a given angle with the longitudinal direction of the strip embodied by the dotted line XX'. The reinforcing ply is assembled with rubber profiled elements 3, 4, 5. It may be seen that, in the transverse direction of the strip, the reinforcing ply does not completely cover the profiled rubber products 3, 4 and 5.

Figure 2:
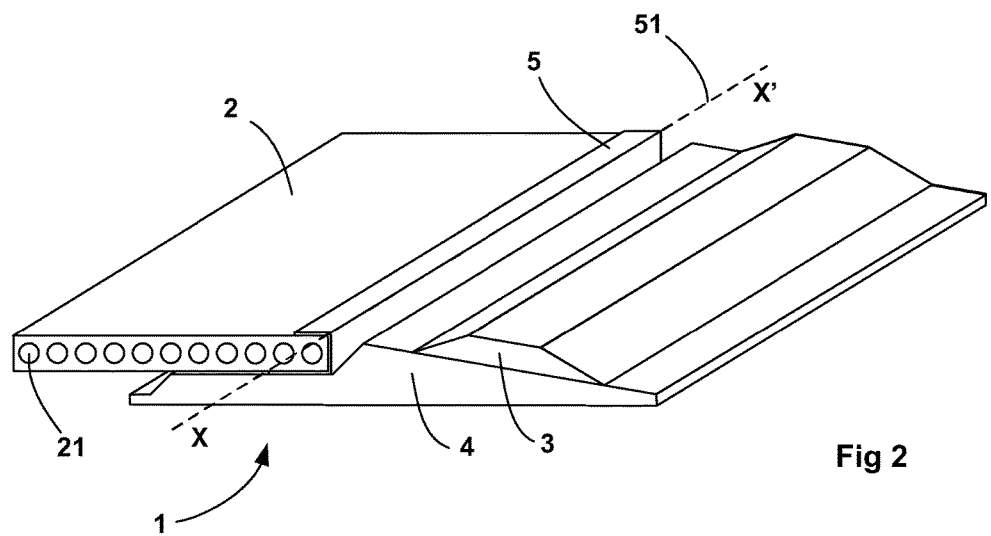
FIG. 2 depicts a schematic perspective view of a second type of strip formed of preassembled products

FIG. 2 depicts a similar assembly in which the reinforcing ply 2 comprises, on one of its selvedges, an edging rubber 5.

The line XX' also represents the reference longitudinal line which may be positioned transversely at a known distance from the two lateral edges of the strip of product. For obvious practical reasons it is often considered that only one of the lateral edges of the strip is used as a reference from which the reference longitudinal line XX' that will serve as a basis for the cutting operation explained in the paragraphs which follow will be positioned.

Figure 3:
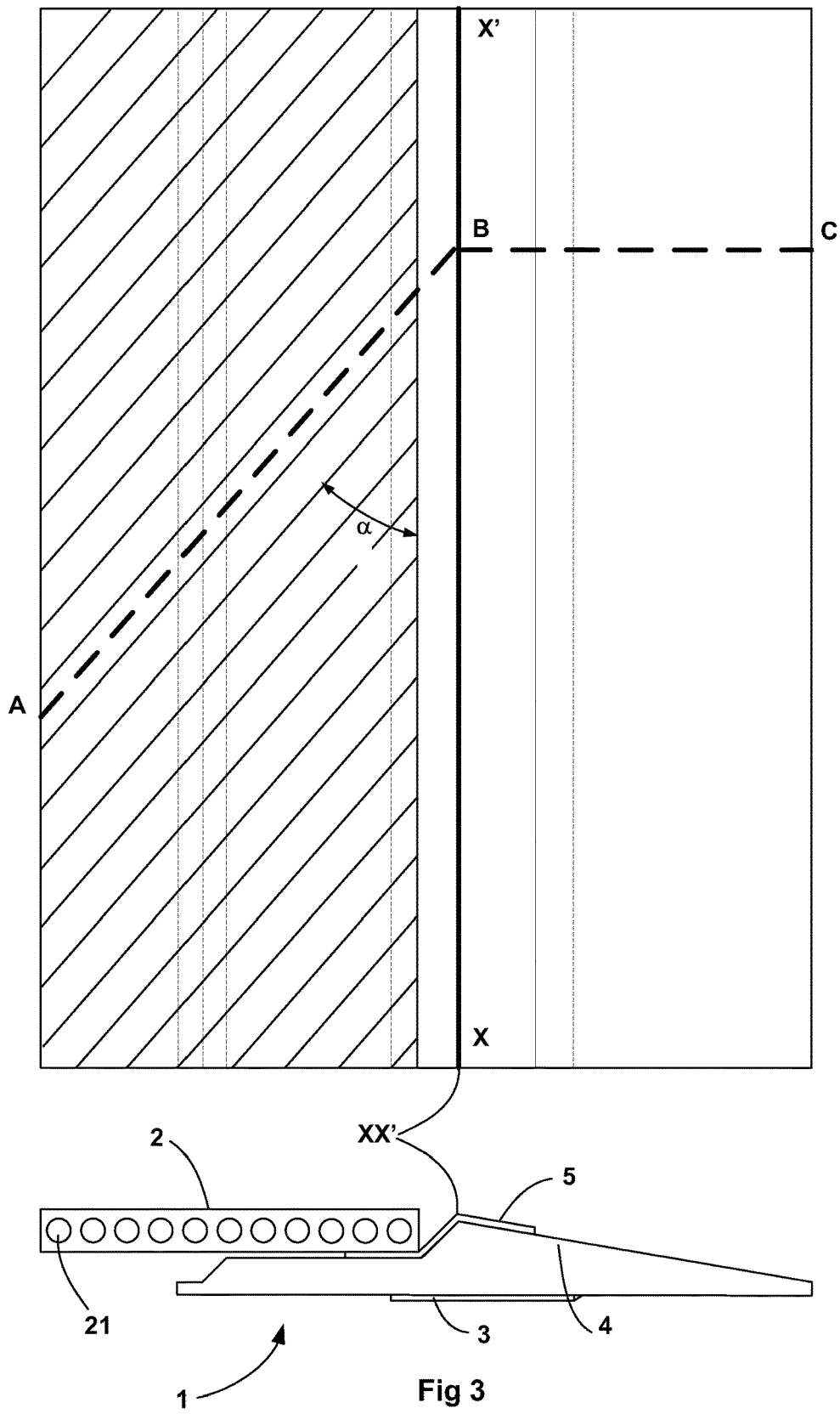
FIG. 3 depicts a schematic view in cross section and in a view from above of the strip of preassembled products

FIG. 3 illustrates, in a view from above, the theoretical path of the cutting line for the strip formed of a first part AB for cutting of the reinforcing ply, ideally passing between two threads and therefore making an angle α equal to the inclination of the threads with the longitudinal direction of the strip, followed by a second part BC for cutting of the part of the rubber profiled elements which are not superposed with the reinforcing ply. The point B, situated on the reference line XX', constitutes the point at which the two parts of the cutting line ABC meet.

It will be pointed out here that this second part of the cutting line may make, with the longitudinal direction of the strip, an arbitrary angle different from the angle α formed by the threads. This angle may usually be equal to 90° as in the case illustrated in FIG. 3, but may just as easily be equal to the angle α, which amounts to defining a rectilinear cutting line making an angle α with the longitudinal direction. However, this second scenario remains restricted to a relatively high angle α, so as to limit the length of the butting edge.

Figure 4:
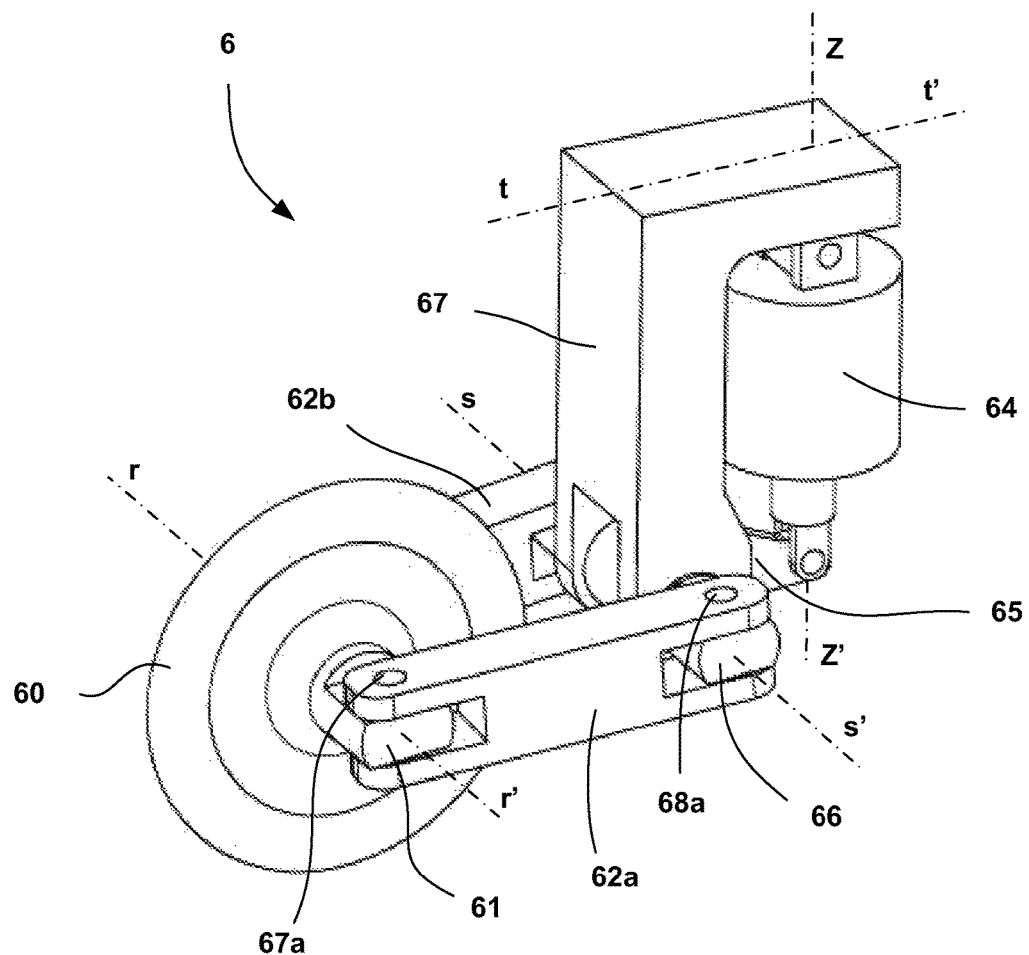
FIG. 4 depicts a schematic perspective view of a cutting means suited to implementing the method according to the invention

FIG. 4 illustrates a cutting means suited to evaluating the actual position of the cutting line when this line does not correspond to the theoretical cutting line.

This type of floating cutter, that allows the actual cutting line to be adapted by passing between the threads, is described in detail in publication U.S. Pat. No. 4,857,123 or alternatively in publication WO 2011/076558 one of the embodiments 6 of which is reproduced in FIG. 4.

According to this embodiment, the cutting wheel 60 revolves freely about an axle 61 the orientation rr' of which is substantially parallel to the plane of the reinforcing ply when the cutting device is in operation.

The axle 61 of the cutting wheel 60 is connected to a drive support 67 moving substantially in a direction tt' parallel to the theoretical direction of the threads, by an articulated frame comprising two link rods 62a and 62b connected by articulations 67a, 67b (which is not visible), 68a, 68b (which is not visible), each to the two ends of an axle 66 secured to the support 67. The direction ss' of the axle 66 is parallel to the direction rr' of the axle 61 on the one hand, and to the two ends of the axle 61 of the cutting wheel 60 on the other.

The axles of the link rods, respectively 67a, 67b, 68a, 68b, are substantially parallel to the direction ZZ' perpendicular to the plane of the reinforcing ply so that movement of the cutting wheel 60 in the direction rr' is accompanied by a pivoting of the link rods about the articulations 67a, 67b, 68a, 68b.

The force with which the wheel is applied to the ply comes from the action of an actuating cylinder 64 on an arm 65 fixed to the axle 66.

When the link rods 62a and 62b are parallel, the plane of the wheel 60 remains perpendicular to the direction rr' and substantially parallel to the direction tt'.

During operation of the cutting means attempts are made to make the path tt' of the drive support correspond to the theoretical cutting line AB and all that is required is for sensors to be used to record the movements of the cutting wheel in the direction rr' in order to assess the actual path of the wheel as it moves between two threads in an actual path which may potentially differ from the theoretical path.

In order to cut the rubber profiled elements which are not superposed with the reinforcing ply and, failing that, block in the direction rr' the movements of the cutting wheel which is no longer guided by the threads between which it was previously running, it is preferable to use a separate cutting means, such as a cutting blade the length of which is equal to the length of the cutting edge.

In this regard, by choosing an angle of 90° the length of the cutting blade used to make the cut along the segment B'C' is limited.

Figure 5:
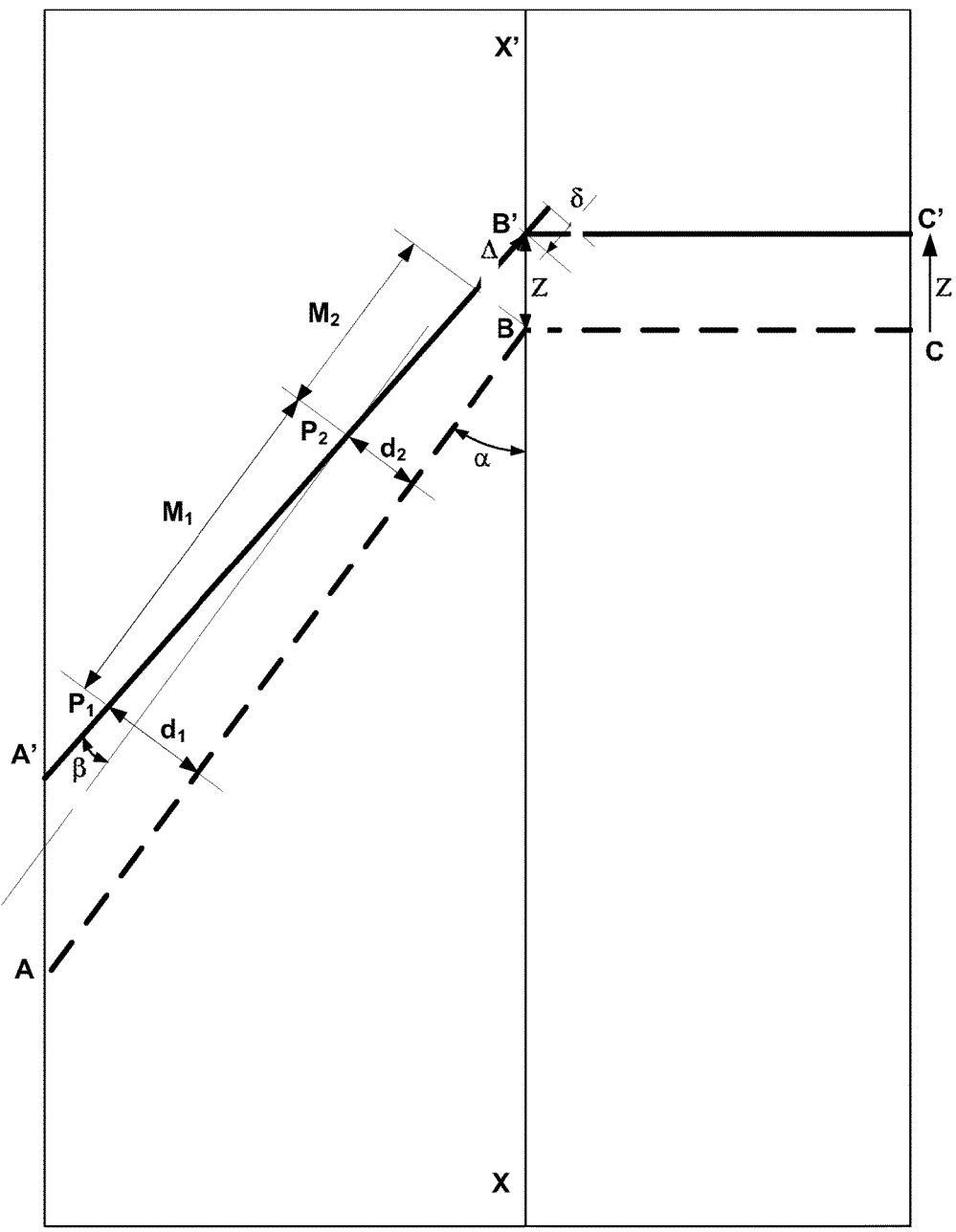
FIG. 5 depicts a geometric view which serves as a basis for calculating the offset.

FIG. 5 illustrates a means of evaluating the actual path A'B'C' of the cutting means.

As a preamble to evaluating the actual path, the strip needs to be positioned precisely in the frame of reference of the cutting device. To do that, the reference side of the strip will be aligned for example along a fixed edge connected with the chassis on which the said cutting device is mounted. The location of the theoretical cutting line ABC is then determined by unwinding the strip by a given set length L, corresponding substantially, after the adjustments which will be explained in what follows have been taken into consideration, to the development of the accepting surface of the tire-building drum onto which the portion of strip that is to be obtained is intended to be laid. The precision of this positioning can also be improved by use of means of detecting the front cutting edge of the strip.

The reference line XX' is then positioned precisely with respect to the frame of reference of the cutting device. In a practical way, steps are taken to ensure that this reference line XX' is situated slightly beyond the inside edge of the reinforcing ply so as to ensure that the cutting blade of the rubber profiled elements that are not superposed with the reinforcing ply will not strike the end of a thread of the ply.

As mentioned hereinabove, the cutting of the strip is then begun by causing the cutting means 6 to penetrate the reinforcing ply. The cutting blade therefore runs between two reinforcing threads along a path A'B' which is not necessarily superposed with the theoretical path AB.

This path may be offset longitudinally but may also differ by an angle β from the theoretical path based on the angle α of the threads 21 of the reinforcing ply 2.

When the wheel reaches the point $P_1$ situated at a distance $M_1+M_2$ from the point A, the discrepancy $d_1$ between the theoretical path and the actual path is then evaluated. And, when the wheel passes the point $P_2$, distant by $M_2$ from the point A, the distance $d_2$ separating the theoretical path from the actual path is measured.

It is then an easy matter, using simple geometric calculations, to determine the additional path Δ that the wheel has to be made to cover in order for it to meet the reference line XX'

$$\text{Tan}\beta = \frac{d_1 - d_2}{M_1}$$

$$\Delta = \frac{1}{\cos\beta} \times \frac{M_1 d_2 + M_2 d_2 - M_2 d_1}{d_1 - d_2 + M_1 \tan\alpha}$$

The progress of the cutting means can also be extended beyond the point B' over a distance δ that is generally short, 4 or 5 millimeters for example, in order to ensure that the cutting lines A'B' and B'C' are clean and allow the portion of strip to be detached effortlessly.

The distance Z between the point B and the point B' is also calculated.

$$Z = \frac{1}{\cos\alpha} \times \frac{M_1 d_2 + M_2 d_2 - M_2 d_1}{d_1 - d_2 + M_1 \tan\alpha}$$

This distance Z is used to determine the positioning of the cutting line B'C' for rubber profiled elements which are not superposed with the reinforcing ply.

The second cutting means is accordingly moved by the value of the offset Z, and the rest of the strip is cut.

The way of determining the values Δ and Z which has been set out hereinabove is not in any way limiting on the application of the method that forms the subject matter of the invention and alternative ways at arriving at a similar result are many so long as the movements of the cutting blade in the frame of reference of the cutting device can be determined accurately.

It is beneficial to note that the fact of moving the cutting line by the value of the offset Z of the actual cutting line A'B'C' with respect to the cutting line ABC substantially alters the length L that had been chosen for the portion of strip intended to be applied to the tire-building drum.

As a result, the method may conceive of putting the precise knowledge of this offset Z to use in each cutting operation in order to adjust accordingly the tension with which the said portion is laid. To do that, a value $Z_{max}$ corresponding to the maximum correction value Z observed over a significant number of samples may be determined experimentally.

A choice is then made to cut the portion of strip to a length L equal to the laying circumference of the tire-building drum less the length $Z_{max}$. The actual length to be laid will then be equal to the length L plus the actual correction Z. The total of these two lengths will remain slightly shorter than the development of the receiving surface, which will allow the portion of the strip of preassembled products to be laid under tension. Knowing the value of Z, and therefore the actual length of the said portion, it is then easy to determine the coefficient of elongation to make the strip undergo while it is being wrapped around the tire-building drum.

The invention claimed is:

1. A method for cutting to length a strip formed of preassembled products comprising one or more rubber profiled elements superposed in part on a reinforcing ply made up of threads coated in rubber and making an angle (a) with a longitudinal direction of the strip, comprising:
   a cutting means (6) running a cutting means between two threads of the reinforcing ply,
   measuring a discrepancy between an actual cutting line (A'B'C') and a theoretical cutting line (ABC), and determining a point of intersection of the actual cutting line (B') with a reference longitudinal line (XX') placed on the strip,
   wherein the actual cutting line (B'C') of that part of the rubber profiled elements that are not superposed with the reinforcing ply is longitudinally offset (Z) with respect to the theoretical cutting line (BC) so that the said actual cutting line (B'C') meets the reference longitudinal line (XX') at the point of intersection (B') of the actual cutting line of the reinforcing ply (A'B') with the said reference longitudinal line (XX'), and the rubber profiled elements that are not superposed with the reinforcing ply are cut along the said actual cutting line.

2. The method according to claim 1, further comprising, prior to cutting, positioning the strip in the frame of reference of the cutting device so that the reference longitudinal line (XX') of the strip is arranged at a known location.

3. The method according to claim 1, wherein, in order to cut the reinforcing ply, use is made of a cutting means (6) able to assess the position of the cutting line.

4. The method according to claim 3, wherein the means of cutting the reinforcing ply comprises a cutting wheel of circular shape that can be oriented according to the angle formed by the threads with the longitudinal direction of the strip (a) and which is free to move in the direction of its axis of rotation (rr').

5. The method according to claim 1, wherein the discrepancy between the actual cutting line (A'B') and the theoretical cutting line (AB) is determined by measuring a distance ($d_1$, $d_2$) between these two lines at two distinct points ($P_1$, $P_2$).

6. The method according to claim 1, wherein the cutting means continues to be run between the threads beyond the point of intersection (B') of the actual cutting line (A'B') and of the reference longitudinal line (XX') by a short distance of given value (δ), so as to make it easier to detach the portion of strip after the part of the rubber profiled elements that are not superposed with the reinforcing ply have been cut.

7. The method according to claim 1, wherein in which the cutting line (B'C') of that part of the rubber profiled elements that is not superposed with the reinforcing ply makes an angle with the longitudinal direction equal to the angle (a) of the threads of the reinforcing ply.

8. The method according to claim 1, wherein the cutting line (B'C') of the part of the rubber profiled elements that is not superposed with the reinforcing ply makes an angle with the longitudinal direction that differs from the angle (a) of the threads of the reinforcing ply.

9. The method according to claim 8, wherein the cutting line of the part of the rubber profiled elements that is not superposed with the reinforcing ply makes a right angle with the longitudinal direction of the strip.

10. The method according to claim 1, wherein, prior to cutting, the strip is moved under the cutting means by a given set length (L) so as to form, after cutting, a portion of strip which is intended to be applied by winding to a tire-building drum of given circumference.

11. The method according to claim 10, wherein the set length (L) of the portion of strip is adjusted so that it is equal to the circumference of the tire-building drum less a maximum given longitudinal offset ($Z_{max}$).

12. A method of applying a portion of strip formed of preassembled products comprising one or more rubber profiled elements and a reinforcing ply made up of threads coated in rubber and making an angle (a) with the longitudinal direction of the strip cut according to the method according to claim 10, wherein tension with which the portion of strip is applied to the tire-building drum is adjusted according to a set length (L) increased by the value of the longitudinal offset (Z) of the actual cutting line.

* * * * *